United States Patent [19]

Bell, Jr. et al.

[11] Patent Number: 5,197,058
[45] Date of Patent: Mar. 23, 1993

[54] ELECTRONIC OFFSET COMPENSATION OF THE CONTINUOUS COMPOSITE TRACK ERROR SIGNAL IN OPTICAL RECORDING

[75] Inventors: Bernard W. Bell, Jr.; David K. Campbell, both of Boise, Id.; Henryk Birecki, Palo Alto, Calif.

[73] Assignee: Hewlett-Packard Company, Palo Alto, Calif.

[21] Appl. No.: 664,881

[22] Filed: Mar. 5, 1991

[51] Int. Cl.$^5$ .............................................. G11B 7/085
[52] U.S. Cl. ............................ 369/44.28; 369/44.34; 369/44.35; 369/50; 369/54
[58] Field of Search ............... 369/44.25, 44.27, 44.28, 369/44.29, 44.34, 44.35, 47, 50, 54, 58

[56] References Cited

U.S. PATENT DOCUMENTS

| | | | |
|---|---|---|---|
| 4,823,330 | 4/1989 | Arter et al. | 369/44.35 |
| 4,849,953 | 7/1989 | Nomura et al. | 369/44.28 |
| 5,101,391 | 3/1992 | Ishii et al. | 369/44.34 X |
| 5,109,367 | 4/1992 | Yoshikawa | 369/44.25 |

Primary Examiner—Wayne R. Young

[57] ABSTRACT

When doing multitrack seek or a single track jump, the midpoint between the maximum and the minimum of a tracking error signal is determined. A peak detector detects the positive peak and the negative peak. These maximum and minimum values are stored in a sample and hold circuit. A summing circuit determines the midpoint between the maximum and the minimum of the tracking error signal. An operational amplifier provides a true error signal to the servo control system that provides the appropriate servo operating point. The invention is based on the fact that even though there is no absolute reference signal indicating the appropriate on-track position, the tracking servo system obtains the track error over the whole range of positions relative to track center when doing a multitrack seek or a single track jump. The appropriate servo operating point is the midpoint between the maximum and the minimum of the track error signal. This provides compensation for level shifts due to factors such as beam displacement, or detector mispositioning, changes in read/write beam profile, and disk tilt. The present invention solves the key disadvantage of the continuous groove tracking method by eliminating tracking offsets without adding additional information to the disk. It also avoids imposing overhead on the data channel. It compensates for effects of disk tilt, detector misalignment, detector and amplifier offsets, and beam decentration due to fine tracking.

5 Claims, 3 Drawing Sheets

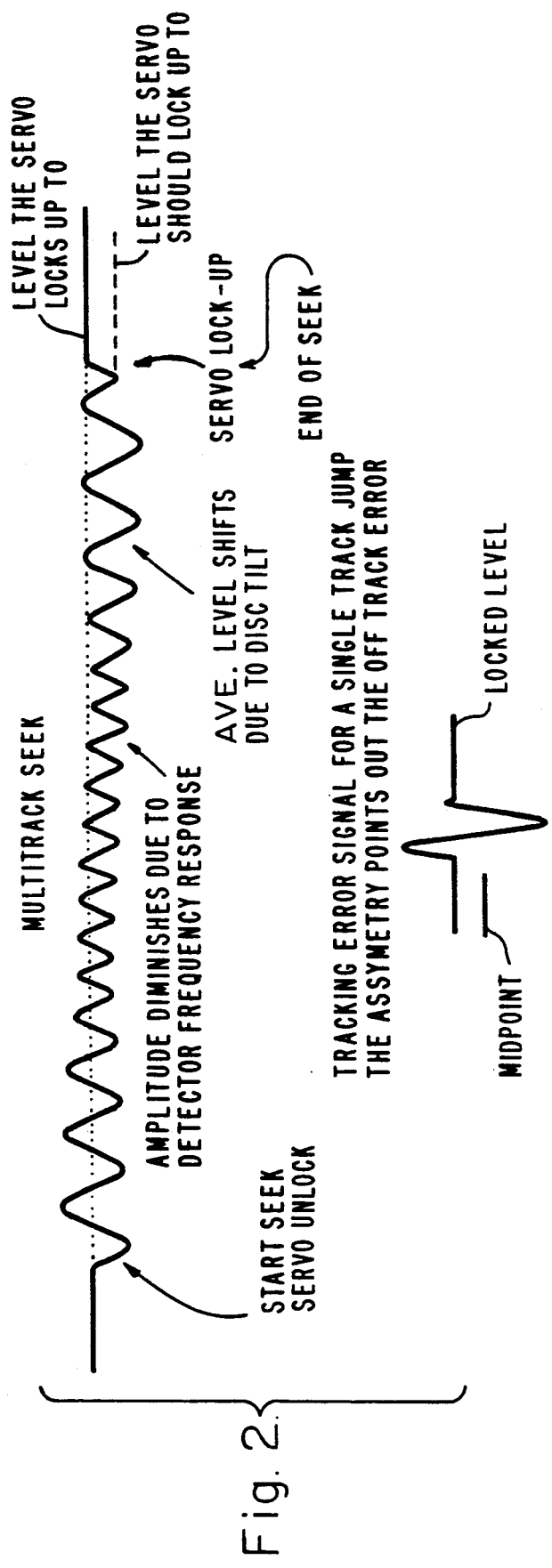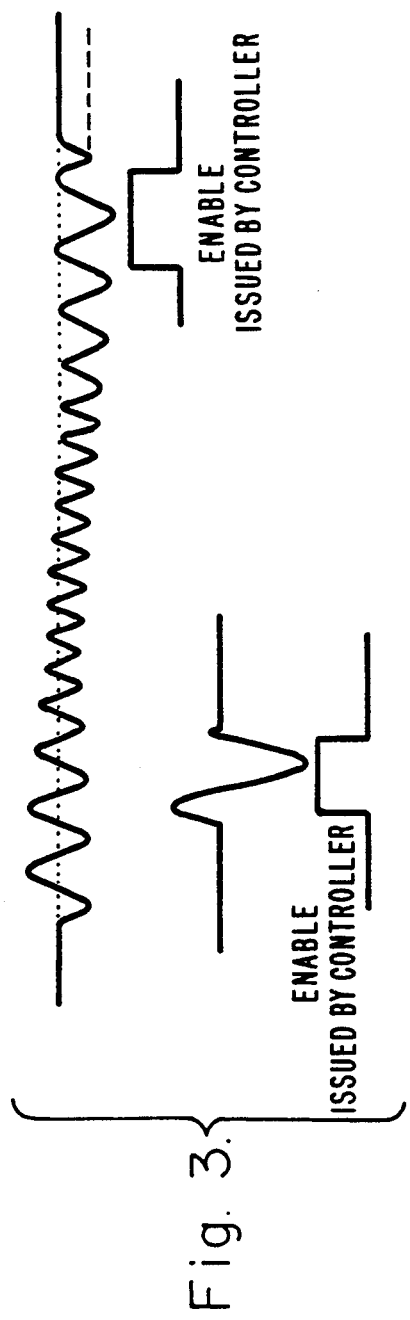

ELECTRONIC OFFSET COMPENSATION OF THE CONTINUOUS COMPOSITE TRACK ERROR SIGNAL IN OPTICAL RECORDING

BACKGROUND

The present invention relates generally to optical recording systems, and more particularly, to maintaining the write/read beam position on the data area of an optical disk very accurately.

Due to the high track density of optical recording it is imperative to maintain the write/read beam position on the data area of an optical disk very accurately. This is done by means of a servo mechanism. Currently there are many methods for obtaining radial position servo error information, and two popular proposed media standards are discussed below.

One standard is based on a continuous groove formed in the optical disk. The recording areas (lands) are separated by shallow grooves. The lands and grooves are typically circular or spiral in shape. Typical center to center spacing between the grooves is 1.6 microns, and the groove width is 0.7 microns and its depth is 0.05 microns. The write/read beam falls predominantly on the lands, but some of its energy impinges on neighboring grooves. Beam motion off the center of the land results in changes in the intensity distribution of the reflected beam. This asymmetry is detected using a split photodetector, for example. The difference in the output of the two halves of the split photodetector produces a tracking error signal. The tracking error signal derived in this manner is usually called a "push-pull" error signal.

The other standard is based on sampling information features prerecorded on the optical disk. Usually this information is prerecorded in an unerasable fashion during substrate fabrication, and consists of pairs of bits (pits or bumps on the disk surface) one after another symmetrically offset from the centerline of each of the lands. The tracking error signal is derived by comparing the signal amplitude from the members of a two-bit pair and holding it until the next pair comes under the beam. In the case of erasable media, the servo sampling information is recorded in the same way as other data, for example. This sampling servo method is implemented having the servo information processed through the data channel between every 16 bytes of user data.

Both of the above methods have their advantages and disadvantages. Specifically, the sampling method is much less sensitive to disk tilt and detector mispositioning errors. On the other hand the sampling method imposes overhead on the data channel, and introduces severe timing problems. The continuous groove tracking method has the major disadvantage of introducing offsets due to disk tilt, detector misalignment, detector and amplifier offsets, beam decentration and lens decentration.

Accordingly, it is an objective of the present invention to provide an optical recording system that maintains the write/read beam position on the data area of an optical disk very accurately. Another objective of the invention is the provision of an optical recording system that controls the write/read beam position accurately without adding additional information to the disk. A further objective of the present invention is to provide an optical recording system that controls the write/read beam position accurately without imposing overhead on the data channel.

Yet another objective of the invention is the provision of a recording system that controls the write/read beam position in such a manner to provide electronic compensation of tracking offsets of tracking level shifts. It is a further objective of the present invention to provide for an offset compensation technique that compensates for effects of disk tilt, detector misalignment detector and amplifier offsets, and beam decentration due to fine tracking.

SUMMARY OF THE INVENTION

In accordance with these and other objectives and features of the present invention, there is provided apparatus and methods that provide for continuous composite track error signal offset compensation in optical disk recording systems. The invention is based on the fact that even though there is no absolute reference signal indicating the appropriate on-track position, the tracking servo system obtains the track error signal over the whole range of positions relative to track center when doing a multirack seek or a single track jump. The appropriate servo operating point is the midpoint between the maximum and the minimum of the track error signal. The present invention solves the key disadvantage of the continuous groove tracking method by eliminating tracking offsets without adding additional information to the disk. It compensates for effects of disk tilt, detector misalignment, detector and amplifier offsets, and beam decentration due to fine tracking (galvanometer tilt or lens decentration).

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 shows track error signal under off track error conditions for the system of FIG. 1;

FIG. 3 shows track error signal under off track error conditions and control signals for the system of FIG. 3.

DETAILED DESCRIPTION

Figure 1:
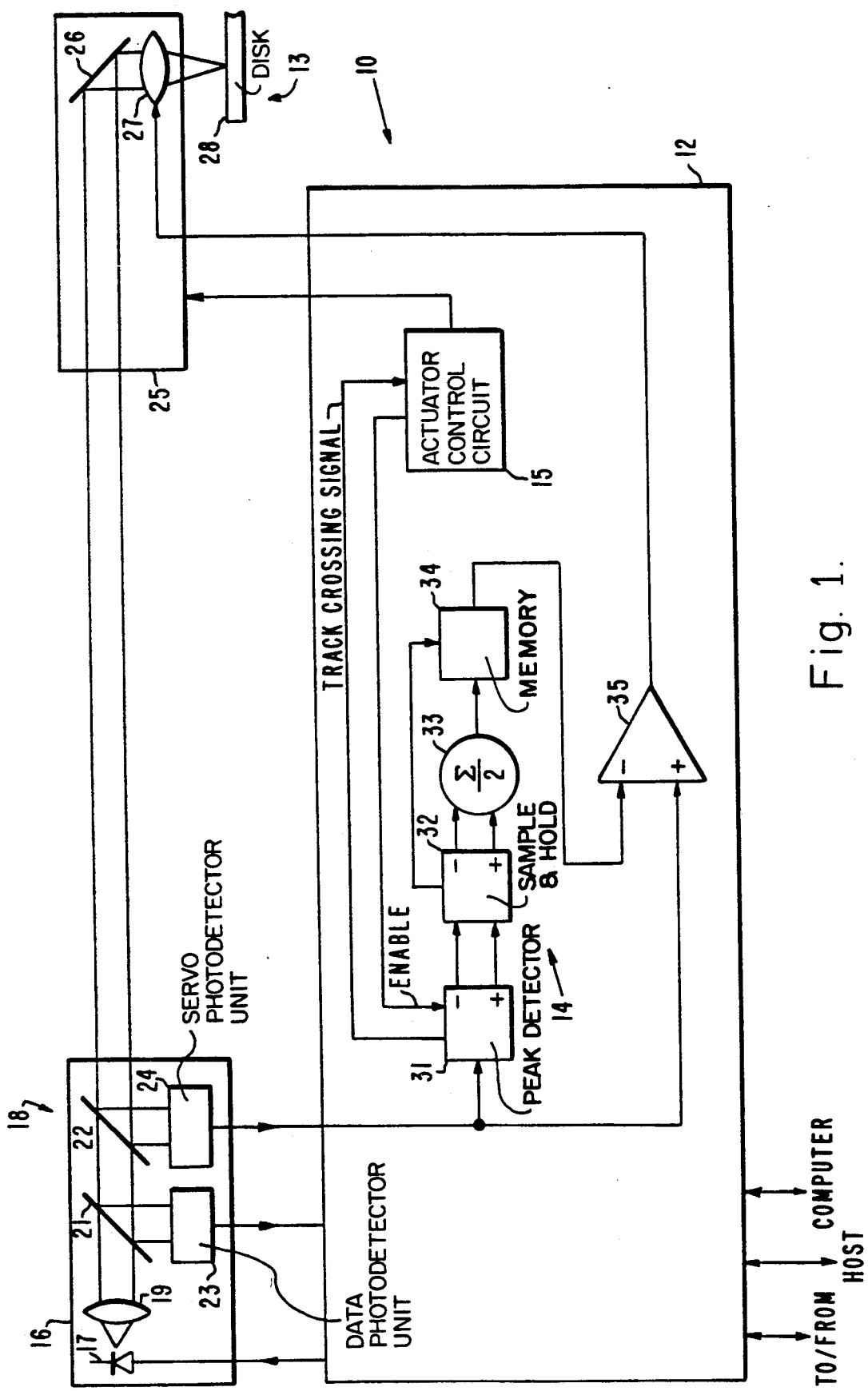
FIG. 1 is a system diagram of an optical disk recording system in which the present invention is employed.

Referring to the drawings, FIG. 1 is a schematic diagram of an optical disk recording system 10 employing track error signal offset compensation in accordance with the principles of the present invention. The system 10 comprises a host computer that is coupled by way of an optical disk controller 12 to an optical disk assembly 13. The controller 12 comprises fine servo control circuitry 14 and actuator control circuitry 15. The fine servo control circuitry 14 provides a track crossing signal to the actuator control circuitry 15 and the actuator control circuitry 15 provides an enable signal to the fine servo control circuitry 14.

The controller 12 is coupled to a laser assembly 16 comprising a diode laser 17, an optical assembly 18 including, for example, a lens 19, first and second beamsplitters 21, 22, and data and servo photodetectors 23, 24. The fine servo control circuitry 14 is coupled to the servo photodetector 24. A moveable actuator 25 is provided that includes a reflector 26 and a focussing lens 27, for example. The focussing lens 27 is adapted to focus a write/read beam on the data area of an optical disk 28. More particularly, it focuses light from the diode laser 17 onto the optical disk 28 and focuses reflected light from the disk 28 onto the data and servo photodetectors 23, 24.

In operation, the actuator control circuitry 15 controls the motion of the actuator 25 for gross movement to specific sectors of the disk 28, while the fine servo control circuitry 14 controls the movement of the lens 27 to focus light from the laser 17 onto the disk 28 and to control the tracking movement of the lens 27 during the reading and writing of data to and from the disk 28. The fine servo control circuitry 14 accurately maintains the write/read beam position on the data area of the disk 28.

FIG. 2 shows the typical appearance of a track error signal in a conventional system not incorporating the present invention under off track error conditions. The upper part of FIG. 2 shows the track error signal for a multirack seek. The start of a seek operation is shown on the left of FIG. 2, while the end of the seek operation is shown on the right. As can be seen from the long wave shown in FIG. 2, the amplitude of the track error signal typically varies.

These sharp rises and falls are caused by the servo photodetector 24 going through local minimum and maximum outputs as the write/read beam moves across the various tracks on the disk 28. In this example, the average level is shown to have shifted due to disk tilt. In addition, the amplitude is shown to diminish due to a change in the frequency of occurrence of local minima and maxima due to changes in actuator speed as a result of convolution with the detector frequency response. It is a feature of the present invention illustrated in FIG. 1 that compensates for the effects of level shift and amplitude change that are illustrated in FIG. 2.

As illustrated at the right of FIG. 2, servo lock-up occurs at the wrong level due to the level shift in the tracking error signal. This in indicated by the solid and dashed horizontal lines at the right of FIG. 2. In the lower part of FIG. 2, there is illustrated a single cycle tracking error signal. This waveform represents the tracking error signal for a single track jump, the asymmetry in the levels of the extreme about the locked level of the single cycle signal is representative of the off track error.

In accordance with the principles of the present invention, the modified servo system shown in FIG. 1 is provided to detect the tracking error signal maxima and minima during track jumps and seeks. The servo system of the present invention adapts the system operating point to eliminate the major disadvantage of the continuous grove tracking method. The invention is based on the fact that even though there is no absolute reference signal indicating the appropriate on-track position, the tracking servo system obtains the track error signal over the whole range of positions relative to track center when doing a multirack seek or a single track jump. The appropriate servo operating point is the midpoint between the local maximum and the minimum of the track error signal.

With reference again to FIG. 1, a typical implementation of the fine servo control circuitry 14 in accordance with the present invention comprises a peak detection circuit 31 that is coupled to a sample and hold circuit 32 and through a summing circuit 33 to an analog memory element 34, such as a D/A converter, for example. Output signals from the servo photodetector 24 and the analog memory element 34 are coupled to an operational amplifier 35 that combines the output signals to produce a true error signal.

FIG. 3 shows the track error signal under off track error conditions and the enable signals issued by the actuator control circuitry 15 and applied to the fine servo control circuitry 14. The start of the multitrack seek operation is shown on the left of FIG. 3, while the end of the seek operation is shown on the right. As can be seen from the multirack seek signal at the top of FIG. 3, the amplitude of the tracking error signal from the servo photodetector 24 is not constant, and the average level of the signal is shifted downward. The enable signal issued by the actuator control circuitry 15 within the controller 12 is applied to the peak detection circuit 31. The peak detection circuit 31 determines the maximum and minimum of the track error signal by detecting the negative peak and the positive peak during the duration of the enable signal. The sample and hold circuit 32 holds the value of the maximum and minimum of the track error signal, and the summing circuit 33 determines the midpoint between the maximum and the minimum. The midpoint is then stored in the analog memory element 34 in accordance with a control signal provided by the sample and hold circuit 32.

A true error signal proportional to that midpoint is applied by the operational amplifier 35 to a tracking coil that controls the position of the focusing lens 27. Thus, the system operating point is adapted to the appropriate servo operating point during the multirack seek operation. Accordingly, this technique compensates for tracking off-sets, thus maintaining the write/read beam position on the data area very accurately.

Similarly, this same compensation technique also operates during the single track jump maneuver. The tracking error signals shown at the bottom of FIG. 3 represents the tracking error signal for a single track jump. As before, the enable signal issued by the actuator control circuitry 15 within the controller 12 is applied to the peak detection circuit 31. Again, the midpoint between the maximum and the minimum of the track error signal is determined, and the true error signal proportional to the appropriate servo operating point is applied to the tracking coil that control the position of the focusing lens 27.

The present invention is particularly well-suited for use with digital servo systems which are currently used in substantially all optical recording systems. The technique of the present invention is especially applicable for removing errors caused by disk tilt.

The present invention solves the major disadvantage of the continuous groove tracking method by eliminating tracking offsets without adding additional information to the disk. It compensates for effects of disk tilt, detector misalignment, detector and amplifier offsets, and beam decentration due to fine tracking, including galvanometer tilt or lens decentration.

The present invention is based on the fact that even though there is no absolute reference signal indicating the appropriate on-track position, the tracking servo system obtains the track error signal over the whole range. offset positions relative to track center when doing a multirack seek or a single track jump. The appropriate servo operation point is the midpoint between the maximum and the minimum of the track error signal.

Figure 4:
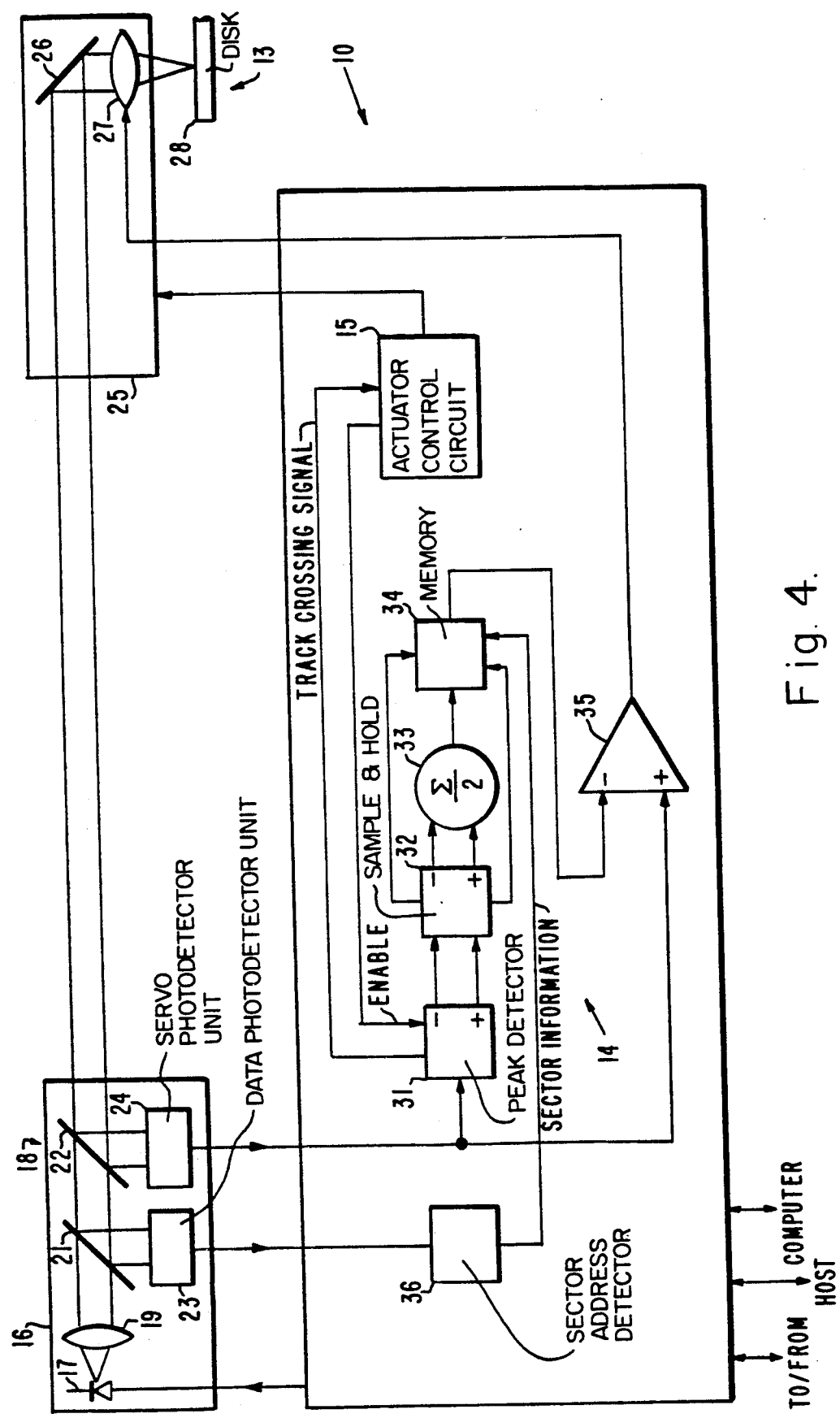
FIG. 4 is a system diagram of a second embodiment of an optical disk recording system in accordance with the present invention.

FIG. 4 illustrates an embodiment of the present invention that corrects for error variations around the track, such as the variation in disk tilt, providing further processing of the information acquired during track jumps and seeks by the disk controller 12. This additional processing is accomplished by expanding the capacity of the memory element 34 so that track error offsets can be stored and recalled and correlated according to the track number and sector information. A sector address detector 36 is provided and is connected from the data photodetector 23, for instance, to the memory element 34 to provide the required sector information.

The information needed to fill up the track error offsets memory is acquired during the initial disk loading process and is further updated during normal operation of the drive as required. The function of the memory element 34 may be further expanded to include interpolation between the stored track offset data base points, if desired. All the above processing is accomplished under the control of microcode instruction set of the controller 12 in a manner generally well known in the art. Again, this circuit is suitable for use in all digital servo-controlled systems.

In operation, the tracking error offset signals are correlated with the sector information during track jump and seek operations to produce a correlated offset signal. The correlated offset signal is combined with the output error signal to produce a combined output error signal that is adapted to control the position of the reading and writing mechanism.

Thus there has been described new and improved continuous composite track error signal offset compensation techniques. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. In an optical disk recording system comprising an optical disk having a plurality of lands separated by grooves, a reading and writing mechanism adapted to read and write data from and to the disk by means of an optical beam, and a controller coupled to the reading and writing mechanism and the disk for controlling the reading and writing of data from and to the disk, and having a servo mechanism optically coupled to the disk and electronically coupled to the controller for providing feedback data indicative of the position of the optical beam relative to the lands of the disk, wherein the improvement comprises:

a peak detector coupled to the servo mechanism and adapted to detect the voltage levels of respective positive and negative peaks in the feedback data output from the servo mechanism;

a sample and hold circuit coupled to the peak detector for sampling and holding the voltage levels of respective positive and negative peaks;

summing means coupled to the sample and hold circuit for finding a midpoint voltage level between the voltage levels of respective positive and negative peaks;

memory means coupled to the sample and hold circuit and to the summing means for storing the midpoint voltage level as a tracking error offset signal;

a sector address detector coupled to the reading and writing mechanism for obtaining sector information derived from the optical disk; and electronic means coupled to the servo mechanism and the memory means for combining the feedback data with a correlated tracking error offset signal to produce an offset error signal that is coupled to the servo mechanism to control the position of the reading and writing mechanism, wherein the controller correlates the tracking error offset signal with the sector information to produce the correlated tracking error offset signal.

2. In an optical disk recording system comprising an optical disk having a plurality of lands separated by grooves, a reading and writing mechanism adapted to read and write data from and to the disk by means of an optical beam, and a controller coupled to the reading and writing mechanism and the disk for controlling the reading and writing of data from and to the disk, and having a servo mechanism optically coupled to the disk and electronically coupled to the controller for providing feedback data indicative of the position of the optical beam relative to the lands of the disk, wherein the improvement comprises:

a peak detector coupled to the servo mechanism and adapted to detect the voltage levels of respective positive and negative peaks in the feedback data output from the servo mechanism;

a sample and hold circuit coupled to the peak detector for sampling and holding the voltage levels of respective positive and negative peaks;

summing means coupled to the sample and hold circuit for finding a midpoint voltage level between the voltage levels of respective positive and negative peaks;

memory means coupled to the sample and hold circuit and to the summing means for storing the midpoint voltage level as a tracking error offset signal in response to a control signal provided by the sample and hold circuit;

a sector address detector coupled to the reading and writing mechanism for obtaining sector information derived from the optical disk;

means for correlating the tracking error offset signals with the sector information, storing the correlated results in the memory means, and generating a correlated tracking error offset signal; and electronic means coupled to the servo mechanism and the memory means for combining the feedback data with a correlated tracking error signal to produce an error signal which is applied to the servo mechanism to control the position of the reading and writing mechanism.

3. A method of controlling the position of a reading and writing mechanism in an optical disk recording system, said method comprising the steps of:

detecting the voltage levels of positive and negative peaks in a signal output of a servo detector;

determining a tracking error offset signal having a voltage indicative of the midpoint of the voltage levels of respective positive and negative peaks;

correlating the tracking error offset signal with sector information during track jumps and seek operations to produce a correlated offset signal; and combining the correlated offset signal with the signal output of the servo detector to produce an output error signal that is adapted to control the position of the reading and writing mechanism.

4. A method of controlling the position of a reading and writing mechanism in an optical disk recording system, said method comprising the steps of:

- detecting the voltage levels of respective positive and negative peaks in a signal output of a servo detector;
- sampling and holding the voltage levels of respective positive and negative peaks;
- determining a tracking error offset signal having a voltage indicative of the midpoint between the voltage levels of respective positive and negative peaks;
- correlating the tracking error offset signal with sector information during track jumps and seek operations to produce a correlated offset signal; and
- combining the correlated offset signal with the signal output of the servo detector to produce an output error signal that is adapted to control the position of the reading and writing mechanism.

5. An apparatus for controlling the position of a reading and writing mechanism in an optical disk recording system, said apparatus comprising:

- a peak detector for detecting the voltage levels of respective positive and negative peaks in a signal output of a servo detector;
- a sample and hold circuit for sampling and holding the voltage levels of respective positive and negative peaks detected by said peak detector;
- an arithmetic circuit, operatively connected to said sample and hold circuit, for averaging the voltage levels of respective positive and negative peaks to produce a tracking error offset signal;
- a correlation circuit for correlating the tracking error offset signal with sector information during track jumps and seek operations to produce a correlated offset signal; and
- a combining circuit for combining one of the tracking error offset signal and the correlated offset signal with the signal output of the servo detector to produce an output error signal that is adapted to control the position of the reading and writing mechanism.

* * * * *